United States Patent
Ning

(10) Patent No.: US 12,514,421 B2
(45) Date of Patent: Jan. 6, 2026

(54) DEVICE STRUCTURE FOR MULTISTAGE WATER-AIR SEPARATION OF CLEANING MACHINE

(71) Applicant: GuangDong Well Technology Co., Ltd, Guangdong (CN)

(72) Inventor: Jianqiang Ning, Guangdong (CN)

(73) Assignee: GuangDong Well Technology Co., Ltd, Huizhou (CN)

( * ) Notice: Subject to any disclaimer, the term of this patent is extended or adjusted under 35 U.S.C. 154(b) by 377 days.

(21) Appl. No.: 18/118,155

(22) Filed: Mar. 7, 2023

(65) Prior Publication Data
US 2024/0023781 A1    Jan. 25, 2024

(30) Foreign Application Priority Data

Jul. 25, 2022  (CN) .......................... 202210874608.1

(51) Int. Cl.
| | | |
|---|---|---|
| *A47L 11/40* | (2006.01) | |
| *A47L 11/34* | (2006.01) | |
| *B01D 19/00* | (2006.01) | |
| *B04B 3/00* | (2006.01) | |
| *B04B 7/18* | (2006.01) | |

(52) U.S. Cl.
CPC ........... *A47L 11/4027* (2013.01); *A47L 11/34* (2013.01); *A47L 11/4016* (2013.01); *B01D 19/0052* (2013.01); *B04B 3/00* (2013.01); *B04B 7/18* (2013.01)

(58) Field of Classification Search
None
See application file for complete search history.

(56) References Cited

U.S. PATENT DOCUMENTS

| | | | | |
|---|---|---|---|---|
| 2001/0047562 A1* | 12/2001 | Lenkiewicz | ........ | A47L 11/4075 15/320 |
| 2002/0066366 A1* | 6/2002 | Conrad | ..................... | B04C 5/24 95/57 |
| 2010/0205919 A1* | 8/2010 | Eide | ........................ | B01D 46/10 55/424 |

FOREIGN PATENT DOCUMENTS

| | | | | |
|---|---|---|---|---|
| CN | 109893034 A | * | 6/2019 | |
| WO | WO-2012146616 A1 | * | 11/2012 | ........... A47L 7/0004 |

OTHER PUBLICATIONS

MT CN109893034 (Year: 2019).*

* cited by examiner

*Primary Examiner* — Peter Keyworth

(57) ABSTRACT

Disclosed is a device structure for multistage water-air separation of a cleaning machine, where an inner wall of a water-air separation box, an outer wall and a bottom plate of a structure part, and a coarse filter screen are enclosed into a primary separation bin, the primary separation bin surrounds the structure part as a center, a side wall of the water-air separation box is provided with an air inlet duct, one end of the air inlet duct is provided with an air outlet and extends into the primary separation bin, the air outlet of the air inlet duct faces a circumferential direction of the primary separation bin, the side wall of the water-air separation box is also provided with a water outlet communicated with an interior of the primary separation bin, and a first opening is connected with a main motor having a suction function.

12 Claims, 7 Drawing Sheets

DEVICE STRUCTURE FOR MULTISTAGE WATER-AIR SEPARATION OF CLEANING MACHINE

CROSS REFERENCE TO RELATED APPLICATIONS

The present application claims the benefit of Chinese Patent Application No. 202210874608.1 filed on Jul. 25, 2022, the contents of which are incorporated herein by reference in their entirety.

TECHNICAL FIELD

The present disclosure relates to the technical field of cleaning machines, and in particular, to a device structure for multistage water-air separation of a cleaning machine.

BACKGROUND

The separation technology of the existing household fabric washing machines (or carpet washing machines) comprises inhaling air containing wastewater into the main body, and generally carrying out a simple separation in the space of the wastewater tank, and there is no special chamber for water and gas separation. Even if there is a water-air separation chamber, it also has a simple structure, for example, a separation structure where a water outlet is set at the lower end and an air outlet is set at the upper end. The separation efficiency of such structure is low, the separation is not complete, and the separated air also contains a certain proportion of wastewater, which will cause secondary pollution to the environment after being discharged from the main body.

SUMMARY

An objective of the present disclosure is to provide a device structure for multistage water-air separation of a cleaning machine, so as to solve the technical problems set forth in the background art that the separation efficiency of the water-air separation box in an existing household fabric washing machine (or carpet washing machine) is low, the separation is not complete, and the separated air also contains a certain proportion of wastewater, which will cause secondary pollution to the environment after being discharged from the main body.

To achieve the above objective, the technical solution of the present disclosure provides a device structure for multistage water-air separation of a cleaning machine, including a water-air separation box. the water-air separation box is designed as a shell extending towards upper right, an end of the water-air separation box facing lower left is provided with a bottom plate and an end of the water-air separation box facing upper right is provided with a first port; a structure part extending towards the upper right is arranged at a middle of the water-air separation box, an end of the structure part facing the lower left is in contact with a middle of the bottom plate, a coarse filter screen is provided between a rim of an end of the structure part towards the upper right and an inner wall of the water-air separation box, the inner wall of the water-air separation box, an outer wall and the bottom plate of the structure part, and the coarse filter screen are enclosed into a primary separation bin, and the primary separation bin surrounds the structure part as a center; a side wall of the water-air separation box is provided with an air inlet duct, one end of the air inlet duct is provided with an air outlet and extends into the primary separation bin, the air outlet of the air inlet duct is in a circumferential direction of the primary separation bin, the side wall of the water-air separation box is also provided with a water outlet communicated with an interior of the primary separation bin, and the first port is connected with a main motor having a suction function.

Further, the structure part is designed as a shell extending towards the upper right, the end of the structure part facing the upper right is provided with a second port, the coarse filter screen is configured to surround a rim of the second port and extend outwards to the inner wall of the water-air separation box; an inner shell is also arranged in the water-air separation box, the inner shell is arranged at an upper right side of the coarse filter screen and is configured as a shell extending towards the upper right, an end of the inner shell facing the upper right is provided with a third port and an end of the inner shell facing the lower left is provided with a fourth port, the third port has a larger cross section than the fourth port, an edge of the third port folds outwards and extends to the inner wall of the water-air separation box, and the fourth port extends downwards to the lower left into the structure part; a side of the inner shell facing the coarse filter screen is provided with a plurality of guide vanes, and an air flow guide groove is formed between two adjacent guide vanes; an inner wall of the structure part and an outer wall of the inner shell are enclosed into a secondary separation bin which surrounds the inner shell as a center, and an inner opening of the air flow guide groove facing the inner shell is in a circumferential direction of the secondary separation bin.

Further, the water-air separation box is designed as a cylindrical shell extending to the upper right, the structure part is shaped as a rotating shell extending to the upper right, the inner shell is shaped as a rotating shell extending to the upper right, and the water-air separation box, the structure part and the inner shell are arranged coaxially; and a diameter of the structure part gradually increases towards the upper right, and a diameter of the inner shell gradually increases towards the upper right.

Further, the end of the structure part towards the lower left is provided with a fifth port, a rim of the fifth port is provided with a soft sealant, and an end of the soft sealant closer to the bottom plate folds outwards and closely fits with the middle of the bottom plate.

Further, the water outlet is arranged below the structure part and is arranged at an end portion of the side wall of the water-air separation box closer to the bottom plate; a wastewater tank is arranged below the water-air separation box, a top of the wastewater tank is provided with a water inlet which is communicated with the water outlet, and the water inlet is provided with a valve.

Further, the side wall of the water-air separation box is also provided with a mounting opening which is arranged above the structure part and in an end portion of the side wall of the water-air separation box closer to the bottom plate; the one end of the air inlet duct passes through the mounting opening and extends into the primary separation bin, the other end of the air inlet duct is provided with an air inlet and extends to the lower left, and the air inlet duct is provided in a flat shape.

Further, the first port is provided with a high-efficiency filter screen which is located at an upper right side of the inner shell, and one side of the high-efficiency filter screen away from the inner shell is connected with an input port of the main motor having a suction function.

Further, a protective shell is arranged at an upper right side of the water-air separation box within which the main motor is arranged, the protective shell is provided with an air vent which is connected with an output port of the main motor.

Further, a sponge is also arranged in the protective shell, and the sponge is located between the air vent and the output port of the main motor.

Further, the device structure for multistage water-air separation of a cleaning machine further includes a main machine shell, and the water-air separation box is mounted to the main machine shell at lower left and lower right sides.

In conclusion, with the above technical solutions, the present disclosure has the following beneficial effects: the structure of the present disclosure is reasonably designed, and the structure is analyzed as follows: (1) the water-air separation box is designed as a shell extending towards upper right, an end of the water-air separation box facing lower left is provided with a bottom plate and an end of the water-air separation box facing upper right is provided with a first port; a structure part extending towards the upper right is arranged at a middle of the water-air separation box, an end of the structure part towards the lower left is in contact with a middle of the bottom plate, a coarse filter screen is provided between a rim of an end of the structure part towards the upper right and an inner wall of the water-air separation box, the inner wall of the water-air separation box, an outer wall and the bottom plate of the structure part, and the coarse filter screen are enclosed into a primary separation bin, and the primary separation bin surrounds the structure part as a center, so that a space (i.e., the primary separation bin) in which air and water can move in a circular motion is formed inside the water-air separation box; (2) a side wall of the water-air separation box is provided with an air inlet duct, one end of the air inlet duct is provided with an air outlet and extends into the primary separation bin, and the air outlet of the air inlet duct is in a circumferential direction of the primary separation bin, so that after external air and water enter the primary separation bin through the air outlet of the air inlet duct, the air and water will move in a circular motion along a circumferential direction of the primary separation bin and move towards the coarse filter screen (i.e., towards the upper right) under the suction of the main motor; (3) the side wall of the water-air separation box is also provided with a water outlet communicated with an interior of the primary separation bin, so that the water separated in the primary separation bin can be discharged to the outside of the water-air separation box through the water outlet; and (4) the first port is connected with a main motor having a suction function, so that on the one hand, the main motor having a suction function can provide power for the movement of the air and water in the air inlet duct and the water-air separation box, and on the other hand, the air separated in the primary separation bin can be sucked out to the outside of the water-air separation box through the first port. Working principle: it can be seen from the above structural analysis that, in the present disclosure, under the suction action of the main motor, wastewater obtained by cleaning a cloth (or a carpet) with water is sucked into a special water-air separation chamber (i.e., the water-air separation box) for water-air separation and filtration: (1) the water-air mixture that is first sucked into a water-air separation chamber (i.e., the water-air separation box) carries out a circumferential movement in a chamber of the primary separation bin, and is subjected to a first separation under an action of the centrifugal force (by using the characteristic of large specific gravity of water and small specific gravity of air), so that water separated by the centrifugal force moves to the wall of the water-air separation box, then is discharged to the outside of the water-air separation box through the water outlet; (2) the water-air mixture that has been separated through the first separation is subjected to a second separation with the coarse filter screen for separating large particles, the separated large particles are left in the primary separation bin and then discharged outward along with the water in the primary separation bin to the outside of the water-air separation box through the water outlet. Technical effects: from the above working principle, it can be seen that in the present disclosure, the efficiency of water-air separation is greatly improved, the sucked water-air mixture is separated by centrifugation as water and air has different specific gravity, then particles are separated by the coarse filter screen, and the final separated air will not cause secondary pollution to air.

Figure 1:
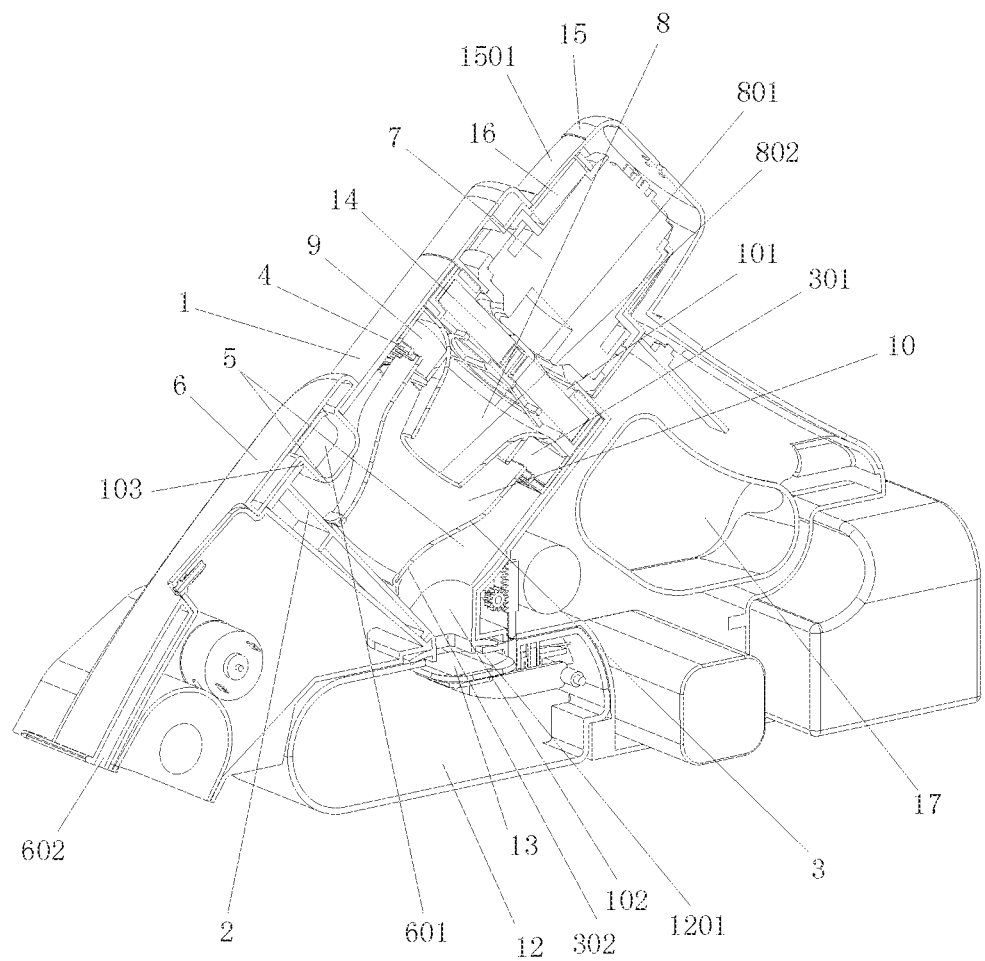
FIG. 1 is a schematic cross-sectional structural diagram of a device structure for multistage water-air separation of a cleaning machine according to the present disclosure.
Figure 2:
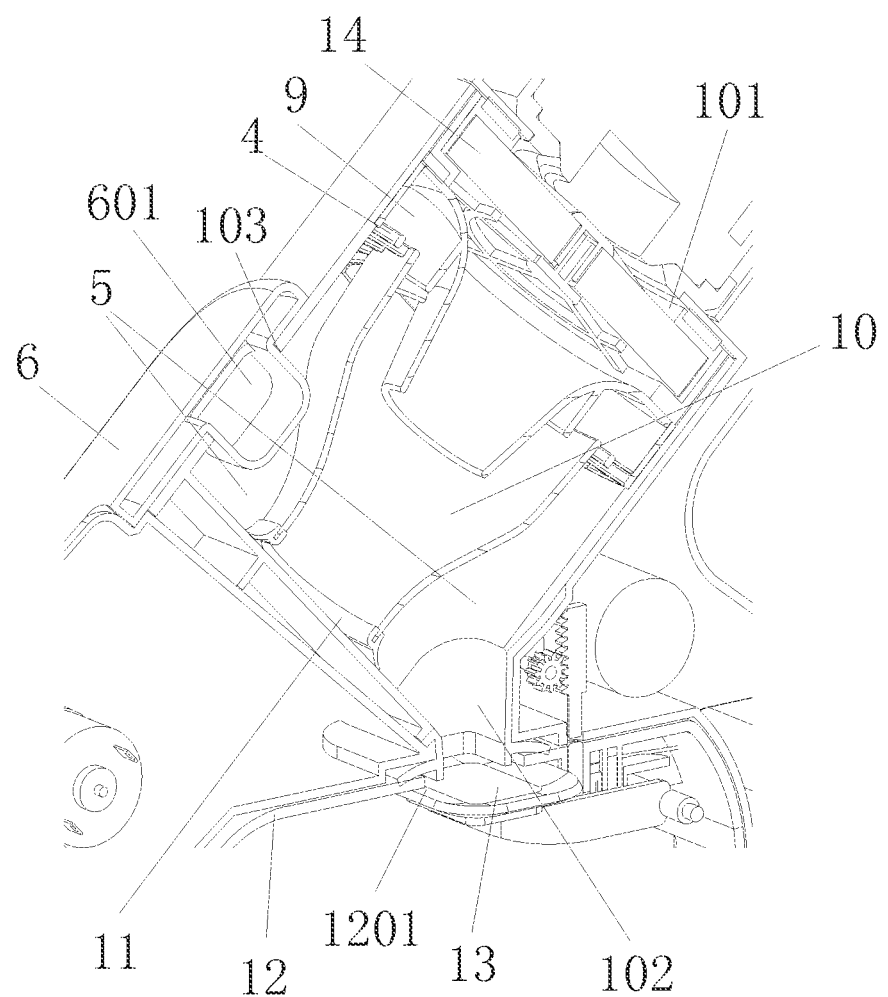
FIG. 2 is a schematic cross-sectional structural diagram of a water-air separation box according to the present disclosure.
Figure 3:
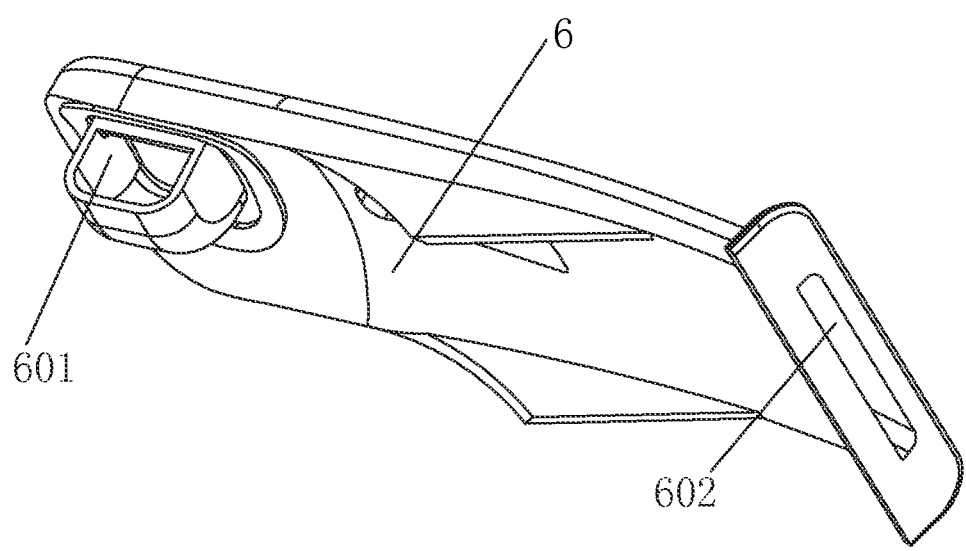
FIG. 3 is a schematic three-dimensional structural diagram of an air inlet duct according to the present disclosure.
Figure 4:
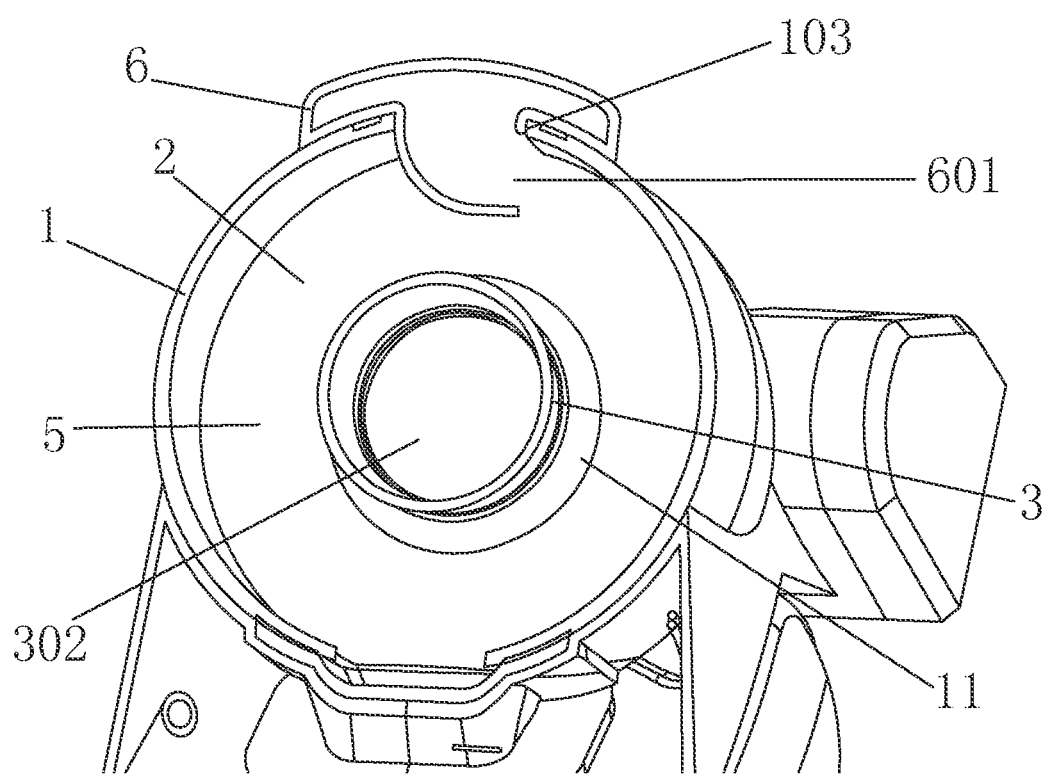
FIG. 4 is a schematic three-dimensional structural diagram in a top view of a water-air separation box, an air inlet duct and a soft sealant that are assembled according to the present disclosure.
Figure 5:
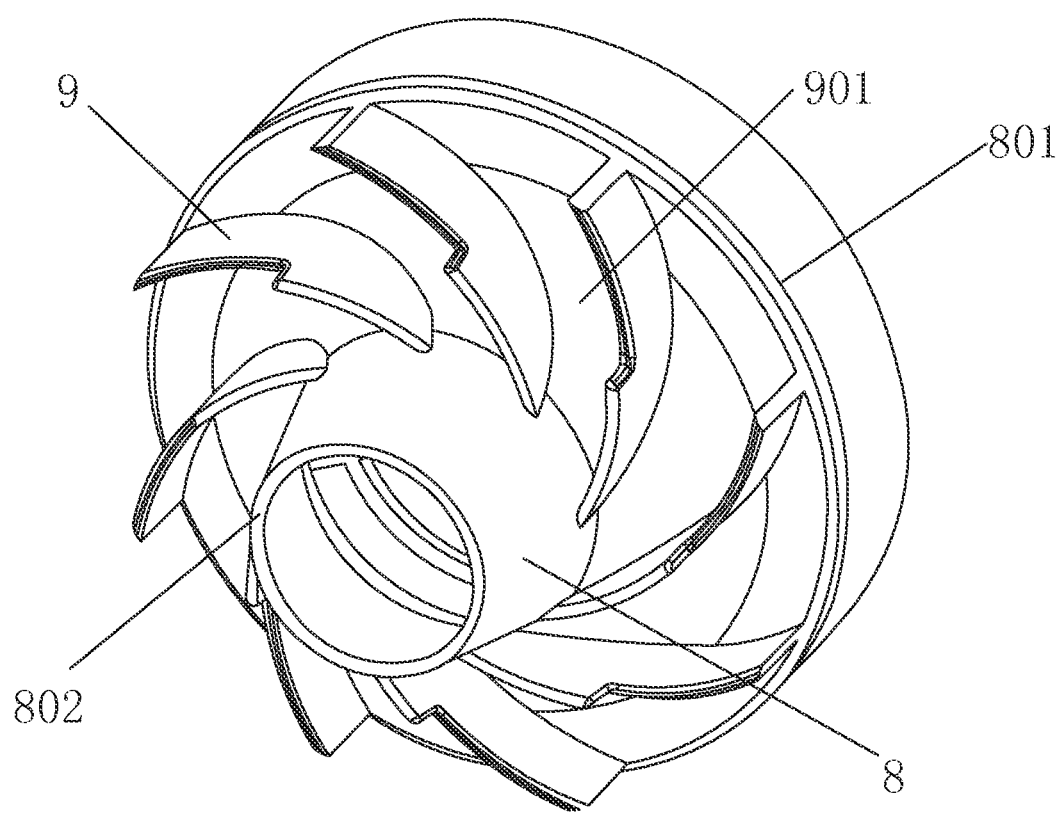
FIG. 5 is a schematic three-dimensional structural diagram in a bottom view of an inner shell according to the present disclosure.
Figure 6:
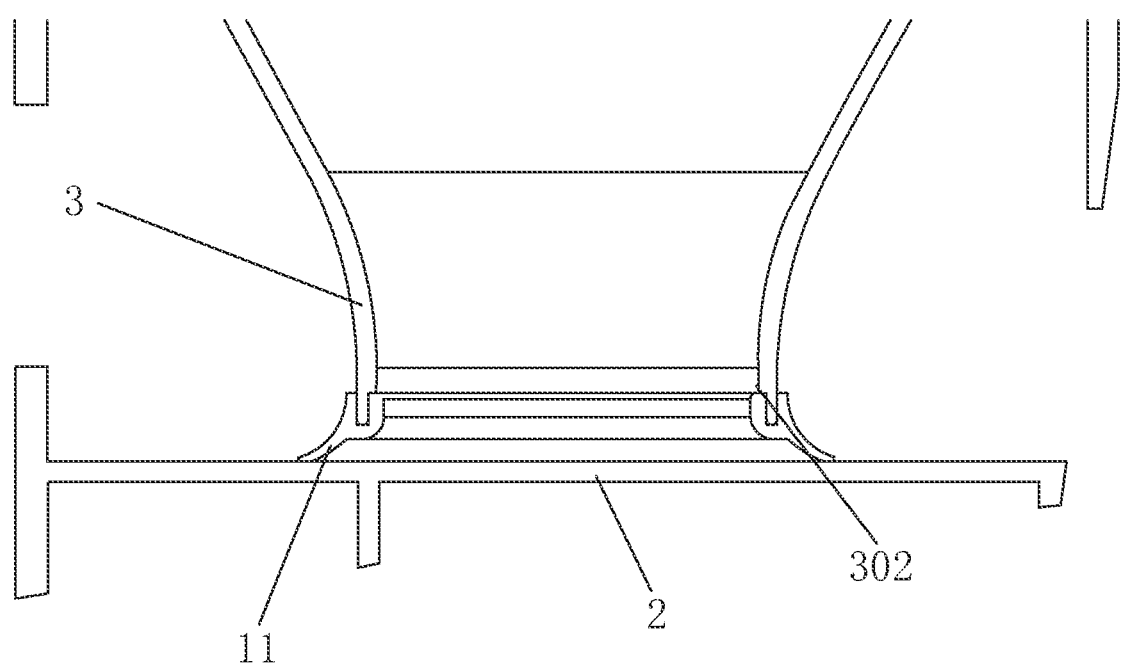
FIG. 6 is a schematic cross-sectional structural diagram in a side view of a bottom plate and a soft sealant that are assembled according to the present disclosure.
Figure 7:
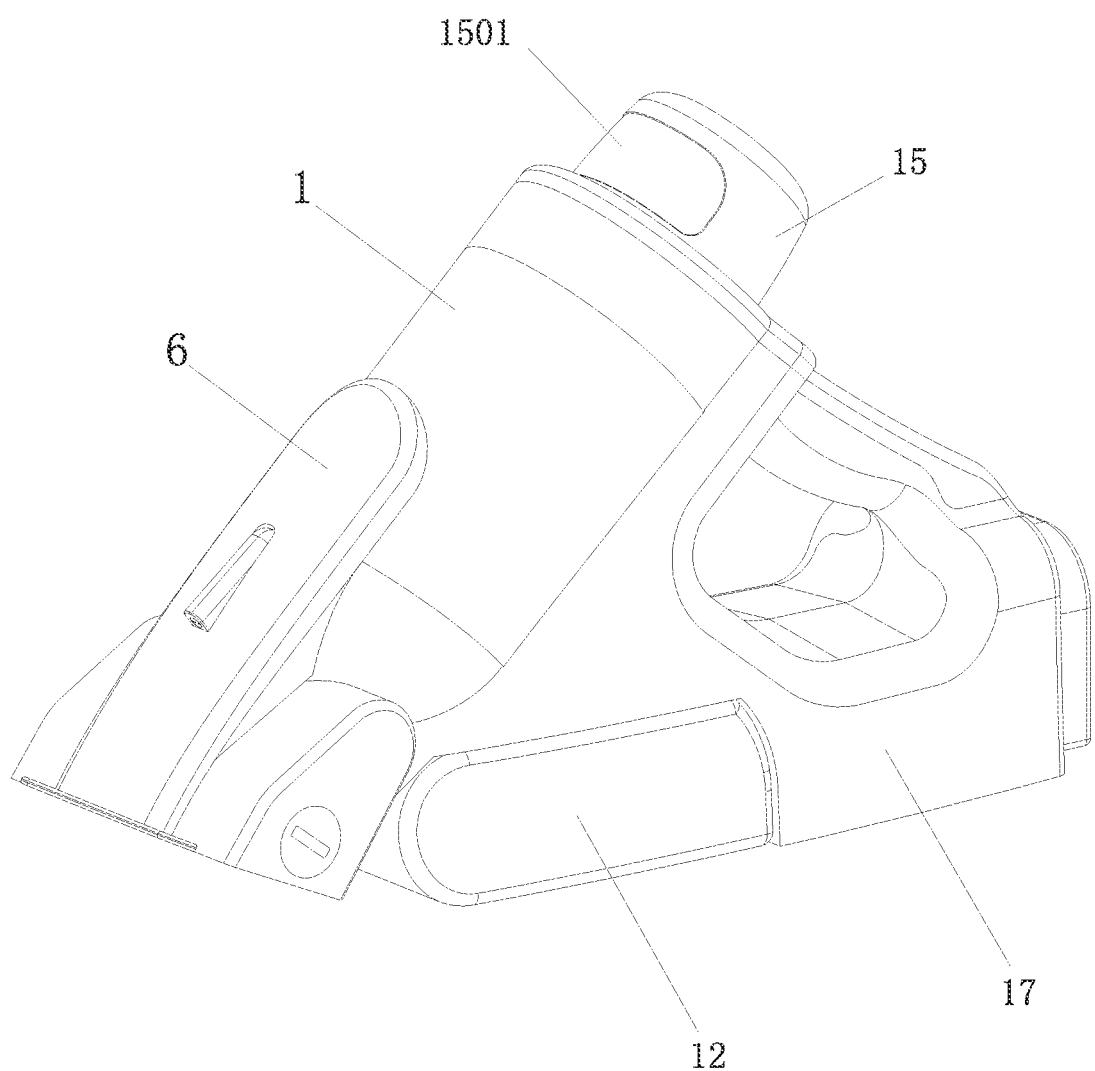
FIG. 7 is a schematic three-dimensional structural diagram of a device structure for multistage water-air separation of a cleaning machine according to the present disclosure.

Reference Numerals: 1—Water-air separation box, 101—First port, 102—Water outlet, 103—Mounting opening; 2—Bottom plate; 3—Structure part, 301—Second port, 302—Fifth port; 4—Coarse filter screen; 5—Primary separation bin; 6—Air inlet duct, 601—Air outlet, 602—Air inlet; 7—Main motor; 8—Inner shell, 801—Third port, 802—Fourth port; 9—Guide vane, 901—Air flow guide groove; 10—Secondary separation bin; 11—Soft sealant; 12—Wastewater tank, 1201—Water inlet; 13—Valve; 14—High-efficiency filter screen; 15—Protective shell, 1501—Air vent; 16—Sponge; 17—Main machine shell.

DETAILED DESCRIPTION

The technical solutions of the present disclosure will be described below clearly and completely with reference to the drawings in the embodiment of the present disclosure, however, the protection scope of the present disclosure is not limited thereto.

In the present disclosure, for a clearer description, the following explanations are made: an observer faces FIG. 1 to observe, the left side of the observer is defined as left, the right side of the observer is defined as right, the front of the observer is defined as front, the rear of the observer is defined as rear, the upper side of the observer is defined as top, and the lower side of the observer is defined as bottom. It should be pointed out that the orientation or positional relationship indicated by the terms "front", "rear", "left", "right", "middle", "above" and "below" in the text represents the orientation or positional relationship set on the basis of the drawings. These terms are merely intended to facilitate the description of the present disclosure, rather than to indicate or imply that the mentioned structure or components must have a specific orientation or must be constructed in a specific orientation. Therefore, these terms should not be understood as a limitation to the present disclosure. Moreover, the terms "first", "second", "third", and "fourth" are used only for the purpose of clarifying or simplifying the description, and are not intended to indicate or imply relative importance or quantity.

Refer to FIG. 1 to FIG. 7. A device structure for multistage water-air separation of a cleaning machine is provided in the present embodiment, including a water-air separation box 1. The water-air separation box 1 is designed as a shell extending towards upper right, an end of the water-air separation box 1 facing lower left is provided with a bottom plate 2 and an end of the water-air separation box 1 facing upper right is provided with a first port 101; a structure part 3 extending towards the upper right is arranged at a middle of the water-air separation box 1, an end of the structure part 3 facing the lower left is in contact with a middle of the bottom plate 2, a coarse filter screen 4 is provided between a rim of an end of the structure part 3 facing the upper right and an inner wall of the water-air separation box 1, the inner wall of the water-air separation box 1, an outer wall and the bottom plate 2 of the structure part 3, and the coarse filter screen 4 are enclosed into a primary separation bin 5, and the primary separation bin 5 surrounds the structure part 3 as a center; a side wall of the water-air separation box 1 is provided with an air inlet duct 6, one end of the air inlet duct 6 is provided with an air outlet 601 and extends into the primary separation bin 5, the air outlet 601 of the air inlet duct 6 is in a circumferential direction of the primary separation bin 5, the side wall of the water-air separation box 1 is also provided with a water outlet 102 communicated with an interior of the primary separation bin 5, and the first port 101 is connected with a main motor 7 having a suction function. Preferably, the water-air separation box 1 and the bottom plate 2 are integrally formed.

Structural analysis: (1) the water-air separation box is designed as a shell extending towards upper right, an end of the water-air separation box facing lower left is provided with a bottom plate and an end of the water-air separation box facing upper right is provided with a first port; a structure part extending towards the upper right is arranged at a middle of the water-air separation box, an end of the structure part towards the lower left is in contact with a middle of the bottom plate, a coarse filter screen is provided between a rim of an end of the structure part towards the upper right and an inner wall of the water-air separation box, the inner wall of the water-air separation box, an outer wall and the bottom plate of the structure part, and the coarse filter screen are enclosed into a primary separation bin, and the primary separation bin surrounds the structure part as a center, so that a space (i.e., the primary separation bin) in which air and water can move in a circular motion is formed inside the water-air separation box; (2) a side wall of the water-air separation box is provided with an air inlet duct, one end of the air inlet duct is provided with an air outlet and extends into the primary separation bin, and the air outlet of the air inlet duct is in a circumferential direction of the primary separation bin, so that after external air and water enter the primary separation bin through the air outlet of the air inlet duct, the air and water will move in a circular motion along a circumferential direction of the primary separation bin and move towards the coarse filter screen (i.e., towards the upper right) under the suction of the main motor; (3) the side wall of the water-air separation box is also provided with a water outlet communicated with an interior of the primary separation bin, so that the water separated in the primary separation bin can be discharged to the outside of the water-air separation box through the water outlet; and (4) the first port is connected with a main motor having a suction function, so that on the one hand, the main motor having a suction function can provide power for the movement of the air and water in the air inlet duct and the water-air separation box, and on the other hand, the air separated in the primary separation bin can be sucked out to the outside of the water-air separation box through the first port.

Working principle: it can be seen from the above structural analysis that, in the present disclosure, under the suction of the main motor, wastewater obtained by cleaning a cloth (or a carpet) with water is sucked into a special water-air separation chamber (i.e., the water-air separation box) water-air separation and filtration: (1) the water-air mixture that is first sucked into a specialized water-air separation chamber (i.e., the water-air separation box) carry out a circumferential movement in a chamber of the primary separation bin, and is subjected to a first separation under an action of the centrifugal force (by using the characteristic of large specific gravity of water and small specific gravity of air), so that water separated by the centrifugal force moves to the wall of the water-air separation box, then is discharged to the outside of the water-air separation box through the water outlet; (2) the water-air mixture that has been separated for the first time is subjected to a second separation with the coarse filter screen for separating large particles, the separated large particles are left in the primary separation bin and then discharged outward to the outside of the water-air separation box through the water outlet. Technical effects: from the above working principle, it can be seen that in the present disclosure, the efficiency of water-air separation is greatly improved, the sucked water-air mixture is separated by centrifugation as water and air has different specific gravity, then particles are separated by the coarse filter screen, and the final separated air will not cause secondary pollution to air. Description: by a limitation "the main motor is working" means that when a user uses a handheld fabric cleaning machine (or carpet washing machine), the main motor having the suction function is powered up. The main motor has the functions of sucking the wastewater into the water-air separation chamber (i.e., the water-air separation box) through the air inlet duct, then separating the wastewater from air in the water-air separation chamber, and extracting the air out of the cleaning machine body. The cleaning machine refers to the handheld fabric cleaning machine or the carpet washing machine.

Specifically, the structure part 3 is designed as a shell extending towards the upper right, the end of the structure part 3 facing the upper right is provided with a second port 301, the coarse filter screen 4 is configured to surround a rim of the second port 301 and extend outwards to the inner wall of the water-air separation box 1; an inner shell 8 is also arranged in the water-air separation box 1, the inner shell 8 is arranged at an upper right side of the coarse filter screen 4 and is configured as a shell extending towards the upper right, an end of the inner shell 8 facing the upper right is provided with a third port 801 and an end of the inner shell 8 facing the lower left is provided with a fourth port 802, the third port 801 has a larger cross section than the fourth port 802, an edge of the third port 801 folds outwards and extends to the inner wall of the water-air separation box 1, and the fourth port 802 extends downwards to the lower left into the structure part 3; a side of the inner shell 8 facing the coarse filter screen 4 is provided with a plurality of guide vanes 9, and an air flow guide groove 901 is formed between two adjacent guide vanes 9; an inner wall of the structure part 3 and an outer wall of the inner shell 8 are enclosed into a secondary separation bin 10 which surrounds the inner shell 8 as a center, and an inner opening of the air flow guide groove 901 facing the inner shell 8 is in a circumferential direction of the secondary separation bin 10. Structural analysis: The structure principle is basically the same as that of the primary separation bin; the inner openings of the air flow guide grooves 901 are in a circumferential direction of the secondary separation bin 10, so that after air containing a small amount of water still enters the secondary separation bin through the coarse filter screen, the air and water will move in a circular direction in a circumferential direction of the secondary separation bin 10 and move towards the fourth port 802 (i.e. the lower left) under the suction of the main motor. Working principle: the water-air mixture after coarse filtration flows into another special device (i.e., the secondary separation bin) and moves in a circular motion to carry out a third water-air separation under the action of a centrifugal force. After the third separation of the water-air mixture, the separated water, under the effect of gravity, no longer follows air to enter the inner shell 8 through the fourth port 802, but accumulates inside the structure part 3. The separated air enters the inner shell 8 through the fourth port 802, and then flows through the third port 801 and the first port 101 to the outside of the water-air separation box 1.

Specifically, the water-air separation box 1 is designed as a cylindrical shell extending to the upper right, the structure part 3 is shaped as a rotating shell extending to the upper right, the inner shell 8 is shaped as a rotating shell extending to the upper right, and the water-air separation box 1, the structure part 3 and the inner shell 8 are arranged coaxially; and a diameter of the structure part 3 gradually increases towards the upper right, and a diameter of the inner shell 8 gradually increases towards the upper right. Effects: The structure part is so designed that, on the one hand, the upward suction force can be increased during the circular motion of the water-air mixture in the primary separation bin because the space where the coarse filter screen is located is relatively small, and on the other hand, more water separated by the centrifugal force can be accommodated. Besides, the inner shell is so designed that it is easy for the water-air mixture to move downward during the circular motion in the secondary separation bin due to the smaller fourth port, which improves separation efficiency.

Specially, the end of the structure part 3 facing the lower left is provided with a fifth port 302, a rim of the fifth port 302 is provided with a soft sealant 11, and an end of the soft sealant 11 closer to the bottom plate 2 folds outwards and closely fits with the middle of the bottom plate 2. Effects: the soft sealant 11 is arranged at the fifth port 302 and is folded outwards, so that when the main motor is started, a negative pressure is formed inside the secondary separation bin due to the suction force and the soft sealant 11 and the bottom plate are tightly pressed together, which renders that the water-air mixture in the primary separation bin cannot enter the secondary separation bin through the fifth port, and can only enter the secondary separation bin through the coarse filter screen; and when the main motor is stopped, due to the accumulation of a certain amount of water in the secondary separation bin, the soft sealant 11 is detached from the bottom plate under the action of water pressure, and the water in the secondary separation bin is discharged to the primary separation bin through the fifth port. Preferably, the soft sealant is silica gel.

Specifically, the water outlet 102 is arranged below the structure part 3 and is arranged at an end portion of the side wall of the water-air separation box 1 closer to the bottom plate 2; a wastewater tank 12 is arranged below the water-air separation box 1, a top of the wastewater tank 12 is provided with a water inlet 1201 which is communicated with the water outlet 102, and the water inlet 1201 is provided with a valve 13. Effects: (1) the water-air mixture that is first sucked into a water-air separation chamber (i.e., the water-air separation box) carries out a circumferential movement in a chamber of the primary separation bin, and is subjected to a first separation under an action of the centrifugal force (by using the characteristic of large specific gravity of water and small specific gravity of air), so that water separated by the centrifugal force moves to the inner wall of the water-air separation box, then flow downward by gravity into the wastewater tank through a drainage port (i.e., the water outlet); (2) the water-air mixture that has been separated through the first separation is subjected to a second separation with the coarse filter screen for separating large particles, the separated large particles are left in the primary separation bin and then enter the wastewater tank through the drainage port (i.e., the water outlet) along with the water in the primary separation bin; (3) the water-air mixture is subjected to a third water-air separation in the secondary separation bin, the separated water, under the effect of gravity, no longer follows air to enter the inner shell 8 through the fourth port 802, but accumulates inside the structure part 3, so that when the main motor is stopped, due to the accumulation of a certain amount of water in the secondary separation bin, the soft sealant 11 is detached from the bottom plate under the action of water pressure, and the water in the secondary separation bin is discharged to the primary separation bin through the fifth port, and then flows into the wastewater tank through the drainage port (i.e., the water outlet) at the bottom. The valve can open and close the water inlet, so as to better control the flow of wastewater.

Specifically, the side wall of the water-air separation box 1 is also provided with a mounting opening 103 which is arranged above the structure part 3 and in an end portion of the side wall of the water-air separation box 1 closer to the bottom plate 2; the one end of the air inlet duct 6 passes through the mounting opening 103 and extends into the primary separation bin 5, the other end of the air inlet duct 6 is provided with an air inlet 602 and extends to the lower left, and the air inlet duct 6 is provided in a flat shape. Effects: The flat air inlet duct can improve the suction force.

Specifically, the first port 101 is provided with a high-efficiency filter screen 14 which is located at an upper right side of the inner shell 8, and one side of the high-efficiency filter screen 14 away from the inner shell 8 is connected with an input port of the main motor 7 having a suction function. Effects: After the third water-air separation in the secondary separation bin, the air in the water-air mixture passes through the fourth port 802 and the third port 801 in turn, and then is subjected to a fourth separation with the high-efficiency filter screen. The separated particles and water are left in the water-air separation box, and then are removed by the user after the high-efficiency filter screen is disassembled. The separated air enters the main motor.

Specifically, a protective shell 15 is arranged at an upper right side of the water-air separation box 1 within which the main motor 7 is arranged, the protective shell 15 is provided with an air vent 1501 which is connected with an output port of the main motor 7.

Specifically, a sponge 16 is also arranged in the protective shell 15, and the sponge 16 is located between the air vent 1501 and the output port of the main motor 7. Effects: After passing through the main motor, the air is subjected to a further separation with a high-density sponge arranged at the air vent to separate a mixture in the air.

Specifically, the device structure for multistage water-air separation of a cleaning machine further includes a main machine shell 17, and the water-air separation box 1 is mounted to the main machine shell 17 at lower left and lower right sides.

In conclusion, (1) Technical problem: The present disclosure aims to improve the efficiency of water and gas separation. For this purpose, a special water-air separation box is provided, within which a special separation structure is arranged, and multiple devices for water-air separation and particle filtration, so that the water and particle contents in the separated air are the lowest, which will not cause secondary pollution to air. (2) Technical solution: Under the suction action of the main motor, the wastewater obtained by cleaning a cloth (or a carpet) with water is sucked into a special water-air separation chamber for multiple water-air separation and filtration. For this, the main body (i.e., the main machine shell) is provided with an air inlet duct 6, the water-air mixture enters the primary separation bin 5 inside the water-gas separation box 1 under the suction of the main motor 7, and moves in a circular motion. By using different specific gravity of water and air, the water-air mixture is subjected to the first separation, and the separated water enters the wastewater tank 12. The separated air mixture is subjected to a second separation with the coarse filter screen 4 for separating large particles. The large particles are separated and left in the water-gas separation chamber (i.e. the water-gas separation box), and then enter the wastewater through a drainage port (i.e. the water outlet) along with the water in the chamber. The air mixture after passing through the coarse filter screen enters the secondary separation bin through the air flow guide grooves 901 and moves in a circular motion, and is subjected to the third water-gas separation under the centrifugal action, and the separated water enters the wastewater tank from the bottom. The separated air passes through the fourth port 802 of the inner shell 8 and is subjected to the fourth separation with the high-efficiency filter screen. The fine particles are separated and removed by the user when the water-air separation box is detached. The air after passing through the high-efficiency filter screen passes through the main motor and then is subjected to filtration with the sponge to filter out the moisture in the air, and the filtered air passes through the air vent into air, and the water and air separation process is complete. (3) Technical effects: The efficiency of water and air separation is greatly improved, the sucked water-air mixture is separated by centrifugation as water and air has different specific gravity, then particles are separated by multiple filters, and the final separated air will not cause secondary pollution to air.

The descriptions above are preferred implementations of the present disclosure. It should be noted that for a person of ordinary skill in the art, various improvements and modifications can be made without departing from the principles of the present disclosure. These improvements and modifications should also be regarded as falling into the protection scope of the present disclosure.

The invention claimed is:

1. A device structure for multistage water-air separation of a cleaning machine, including a water-air separation box (1), wherein the water-air separation box (1) is designed as a first shell extending towards upper right, an end of the water-air separation box (1) facing lower left is provided with a bottom plate (2) and an end of the water-air separation box (1) facing upper right is provided with a first port (101); a structure part (3) extending towards the upper right is arranged at a middle of the water-air separation box (1), an end of the structure part (3) facing the lower left is in contact with a middle of the bottom plate (2), a coarse filter screen (4) is provided between a rim of an end of the structure part (3) facing the upper right and an inner wall of the water-air separation box (1), the inner wall of the water-air separation box (1), an outer wall and the bottom plate (2) of the structure part (3), and the coarse filter screen (4) are enclosed into a primary separation bin (5), and the primary separation bin (5) surrounds the structure part (3) as a center; a side wall of the water-air separation box (1) is provided with an air inlet duct (6), one end of the air inlet duct (6) is provided with an air outlet (601) and extends into the primary separation bin (5), the air outlet (601) of the air inlet duct (6) is in a circumferential direction of the primary separation bin (5), the side wall of the water-air separation box (1) is also provided with a water outlet (102) communicated with an interior of the primary separation bin (5), and the first port (101) is connected with a main motor (7) having a suction function;

the structure part (3) is designed as a second shell extending towards the upper right, the end of the structure part (3) facing the upper right is provided with a second port (301), the coarse filter screen (4) is configured to surround a rim of the second port (301) and extend outwards to the inner wall of the water-air separation box (1); an inner shell (8) is also arranged in the water-air separation box (1), the inner shell (8) is arranged at an upper right side of the coarse filter screen (4) and is configured as a third shell extending towards the upper right, an end of the inner shell (8) facing the upper right is provided with a third port (801) and an end of the inner shell (8) facing the lower left is provided with a fourth port (802), the third port (801) has a larger cross section than the fourth port (802), an edge of the third port (801) folds outwards and extends to the inner wall of the water-air separation box (1), and the fourth port (802) extends downwards to the lower left into the structure part (3); a side of the inner shell (8) facing the coarse filter screen (4) is provided with a plurality of guide vanes (9), and an air flow guide groove (901) is formed between two adjacent guide vanes (9); an inner wall of the structure part (3) and an outer wall of the inner shell (8) are enclosed into a secondary separation bin (10) which surrounds the inner shell (8) as a center, and an inner opening of the air flow guide groove (901) facing the inner shell (8) is in a circumferential direction of the secondary separation bin (10);

the end of the structure part (3) towards the lower left is provided with a fifth port (302), a rim of the fifth port (302) is provided with a soft sealant (11), and an end of the soft sealant (11) closer to the bottom plate (2) folds outwards and closely fits with the middle of the bottom plate (2); and the water outlet (102) is arranged below the structure part (3) and is arranged at an end portion of the side wall of the water-air separation box (1) closer to the bottom plate (2); a wastewater tank (12) is arranged below the water-air separation box (1), a top of the wastewater tank (12) is provided with a water inlet (1201) which is communicated with the water outlet (102), and the water inlet (1201) is provided with a valve (13).

2. The device structure for multistage water-air separation of a cleaning machine according to claim 1, wherein the water-air separation box (1) is designed as a cylindrical shell extending to the upper right, the structure part (3) is shaped as the second shell extending to the upper right, which is rotational symmetric, the inner shell (8) is shaped as the third shell extending to the upper right, which is rotational symmetric, and the water-air separation box (1), the structure part (3) and the inner shell (8) are arranged coaxially; and a diameter of the structure part (3) gradually increases towards the upper right, and a diameter of the inner shell (8) gradually increases towards the upper right.

3. The device structure for multistage water-air separation of a cleaning machine according to claim 2, wherein the end of the structure part (3) towards the lower left is provided with a fifth port (302), a rim of the fifth port (302) is provided with a soft sealant (11), and an end of the soft sealant (11) closer to the bottom plate (2) folds outwards and closely fits with the middle of the bottom plate (2).

4. The device structure for multistage water-air separation of a cleaning machine according to claim 3, wherein the water outlet (102) is arranged below the structure part (3) and is arranged at an end portion of the side wall of the water-air separation box (1) closer to the bottom plate (2); a wastewater tank (12) is arranged below the water-air separation box (1), a top of the wastewater tank (12) is provided with a water inlet (1201) which is communicated with the water outlet (102), and the water inlet (1201) is provided with a valve (13).

5. The device structure for multistage water-air separation of a cleaning machine according to claim 2, wherein the side wall of the water-air separation box (1) is also provided with a mounting opening (103) which is arranged above the structure part (3) and in an end portion of the side wall of the water-air separation box (1) closer to the bottom plate (2); the one end of the air inlet duct (6) passes through the mounting opening (103) and extends into the primary separation bin (5), the other end of the air inlet duct (6) is provided with an air inlet (602) and extends to the lower left, and the air inlet duct (6) is provided in a flat shape.

6. The device structure for multistage water-air separation of a cleaning machine according to claim 2, wherein the first port (101) is provided with a high-efficiency filter screen (14) which is located at an upper right side of the inner shell (8), and one side of the high-efficiency filter screen (14) away from the inner shell (8) is connected with an input port of the main motor (7) having a suction function.

7. The device structure for multistage water-air separation of a cleaning machine according to claim 2, wherein the device structure for multistage water-air separation of a cleaning machine further includes a main machine shell (17), and the water-air separation box (1) is mounted to the main machine shell (17) at lower left and lower right sides.

8. The device structure for multistage water-air separation of a cleaning machine according to claim 1, wherein the side wall of the water-air separation box (1) is also provided with a mounting opening (103) which is arranged above the structure part (3) and in an end portion of the side wall of the water-air separation box (1) closer to the bottom plate (2); the one end of the air inlet duct (6) passes through the mounting opening (103) and extends into the primary separation bin (5), the other end of the air inlet duct (6) is provided with an air inlet (602) and extends to the lower left, and the air inlet duct (6) is provided in a flat shape.

9. The device structure for multistage water-air separation of a cleaning machine according to claim 1, wherein the device structure for multistage water-air separation of a cleaning machine further includes a main machine shell (17), and the water-air separation box (1) is mounted to the main machine shell (17) at lower left and lower right sides.

10. The device structure for multistage water-air separation of a cleaning machine according to claim 1, wherein the side wall of the water-air separation box (1) is also provided with a mounting opening (103) which is arranged above the structure part (3) and in an end portion of the side wall of the water-air separation box (1) closer to the bottom plate (2); the one end of the air inlet duct (6) passes through the mounting opening (103) and extends into the primary separation bin (5), the other end of the air inlet duct (6) is provided with an air inlet (602) and extends to the lower left, and the air inlet duct (6) is provided in a flat shape.

11. The device structure for multistage water-air separation of a cleaning machine according to claim 1, wherein the first port (101) is provided with a high-efficiency filter screen (14) which is located at an upper right side of the inner shell (8), and one side of the high-efficiency filter screen (14) away from the inner shell (8) is connected with an input port of the main motor (7) having a suction function.

12. The device structure for multistage water-air separation of a cleaning machine according to claim 1, wherein the device structure for multistage water-air separation of a cleaning machine further includes a main machine shell (17), and the water-air separation box (1) is mounted to the main machine shell (17) at lower left and lower right sides.

* * * * *